March 30, 1937. W. T. CAPPS 2,075,638
LOCOMOTIVE STOKER
Original Filed April 5, 1932 7 Sheets-Sheet 2

Inventor
Washington T. Capps
By Edwin S. Clarkson
Attorney

Inventor
Washington T. Capps
By Edwin S. Clarkson
Attorney

Patented Mar. 30, 1937

2,075,638

UNITED STATES PATENT OFFICE 2,075,638

LOCOMOTIVE STOKER

Washington T. Capps, Baltimore, Md., assignor by mesne assignments, to The Standard Stoker Company, Inc., a corporation of Delaware Application April 5, 1932, Serial No. 603,331
Renewed July 5, 1935

13 Claims. (Cl. 110—101)

This invention relates to improvements in locomotive stokers of that general type shown in my prior Patent No. 1,875,216, dated August 30, 1932, comprising a distributor tube adapted for connection with the fuel discharge member of the stoker and coaction with a steam jet nozzle or device carried thereby, and which tube carries at its forward end a top deflector plate and bottom distributor plate extending into the locomotive firebox and controlling the feed of the fuel thereto.

One object of my present invention is to provide a distributor mechanism of the character described which, while retaining the desirable features of the distributor mechanism set forth in my aforesaid Patent No. 1,875,216, also embodies novel and improved features whereby the efficiency of the distributor is increased, wear and tear reduced, and greater facility and convenience afforded in making repairs and substituting new parts for old parts when occasion requires.

In carrying out the above object of my invention, I have devised improved means for detachably connecting one member of the distributing mechanism with its supporting member, which means can be used advantageously with distributor mechanism of various constructions. Accordingly, the provision of this improved means for detachably connecting distributor members constitutes a further object of my invention.

Another object of the invention is to provide detachable top deflector and bottom distributor plates which may be readily and separately replaced when unduly damaged or worn by heat, abrasion or accidental injury, without the necessity, in the event of replacing either plate, of removing the other plate or the distributor tube, and which plates are adapted to be stably secured to and braced from the distributor tube.

Still another object of the invention is to provide a distributor tube and bottom distributor plate having registering side channels coacting to obtain a fuel distributing action of a highly effective character.

Still another object of the invention is to provide a removable wear plate at the rear of the distributor tube to sustain the wear and abrasive action from the fuel and steam jet at this point and relieve the tube therefrom, which plate, when worn, may be replaced at small cost, and thus preventing the wearing through of the tube at this point and the relatively great cost of replacing the same.

With these and other objects in view, the invention consists of the features of construction, combination and arrangement of parts, hereinafter fully described and claimed, reference being had to the accompanying drawings, in which:—

Figure 1:
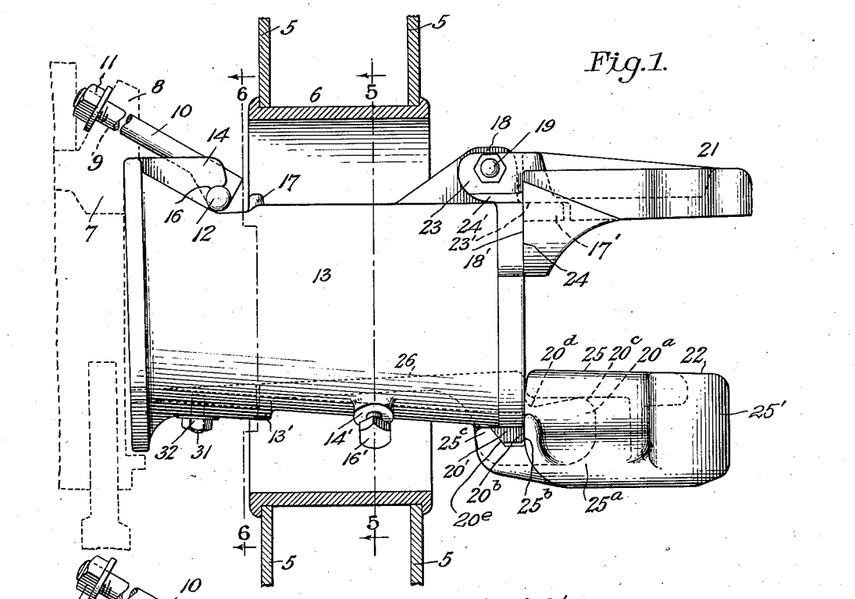
Fig. 1 is a side elevational view of my improved stoker distributor with associated parts in dotted lines.
Figure 2:
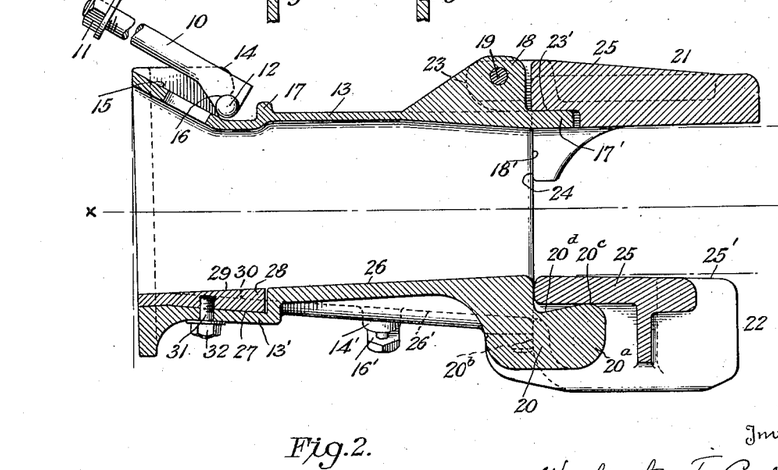
Fig. 2 is a central vertical longitudinal section of the same on line 2—2 of Fig. 3.
Figure 3:
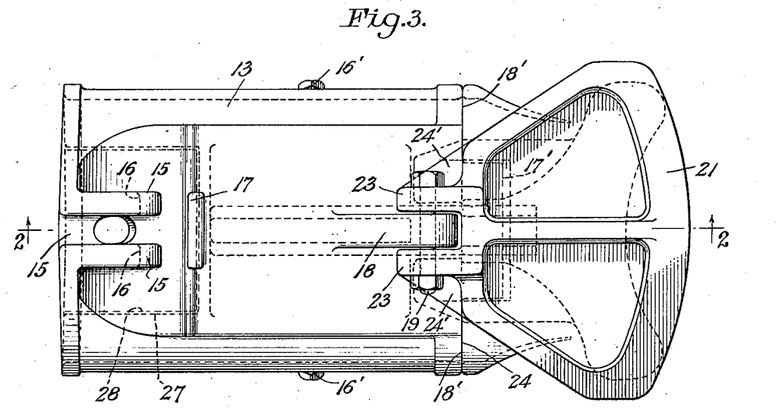
Fig. 3 is a top plan view of the improved distributor tube.
Figure 4:
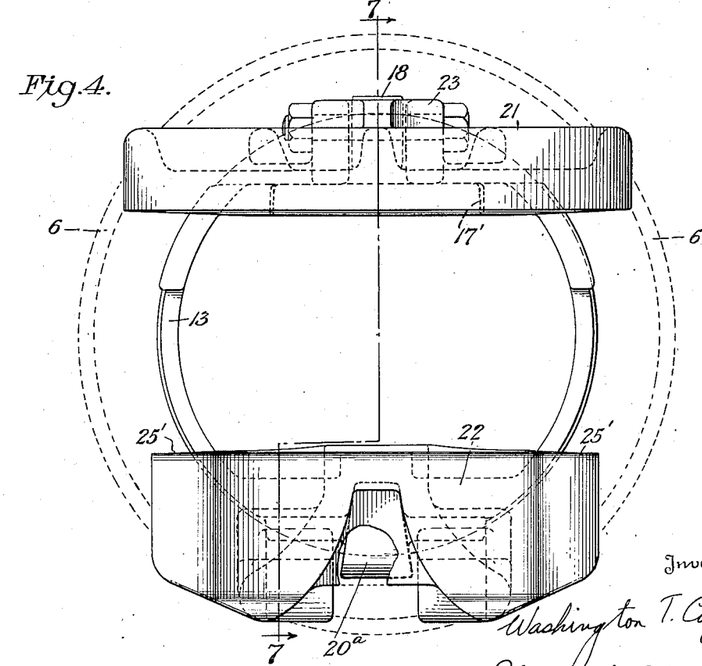
Fig. 4 is a front end elevation of the same.
Figure 5:
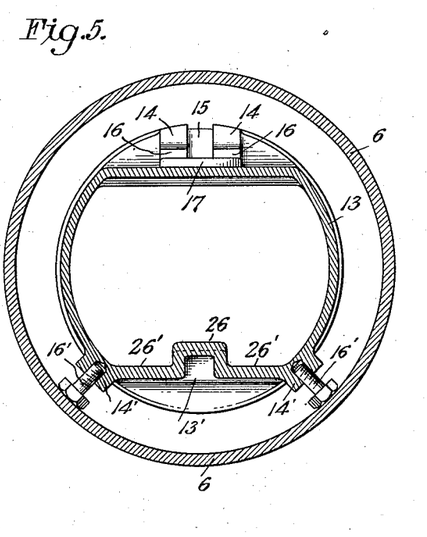
Fig. 5 is a cross section on line 5—5 of Fig. 1.
Figure 6:
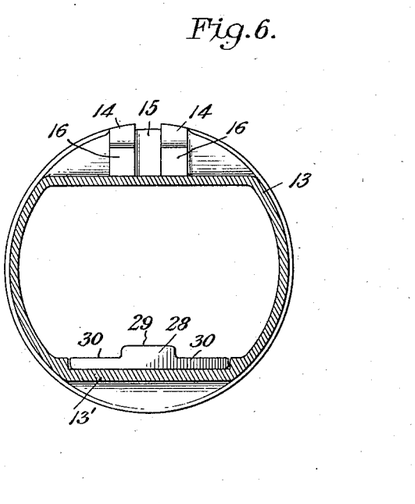
Fig. 6 is a cross section on line 6—6 of Fig. 1.
Figure 7:
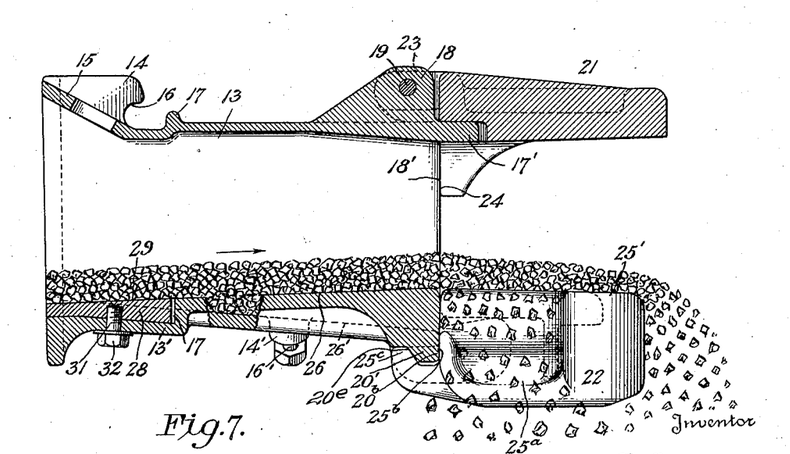
Fig. 7 is a vertical longitudinal section taken substantially on line 7—7 of Fig. 4 (the bottom deflector plate appearing in side elevation), showing the travel of the fuel.
Figure 8:
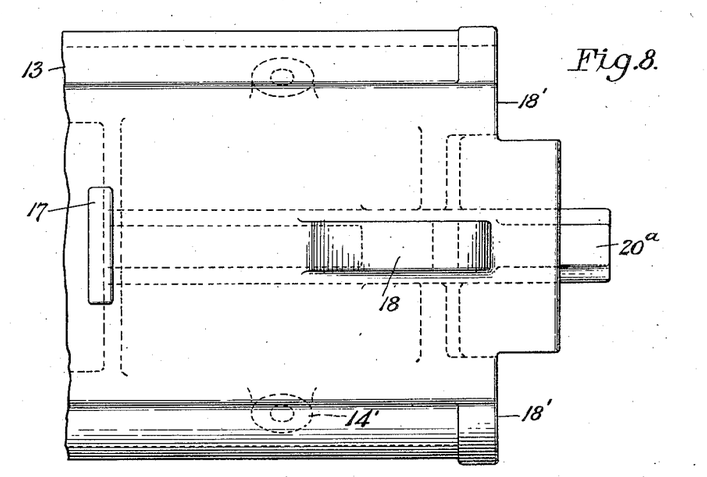
Fig. 8 is a fragmentary top plan view of the distributor tube.
Figures 9, 10:
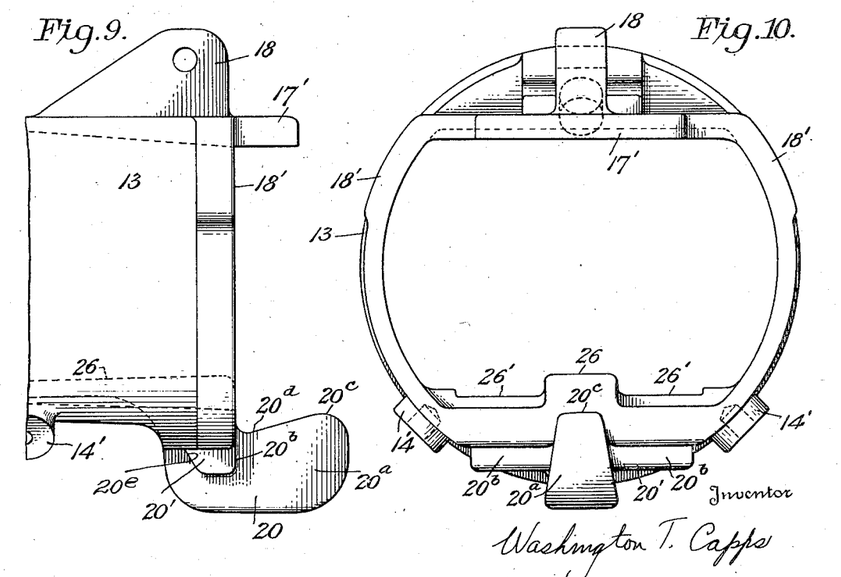
Fig. 9 is a fragmentary side view of the same.
Fig. 10 is an end elevation of the forward end of the distributor tube.
Figure 11:
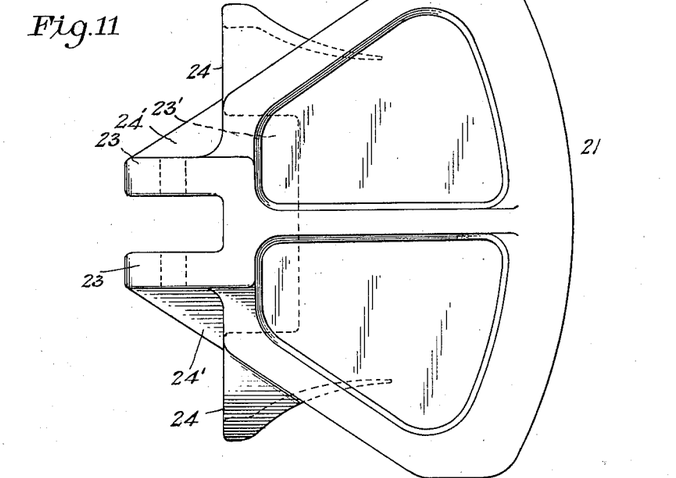
Fig. 11 is a top plan view of the deflector plate.
Figure 12:
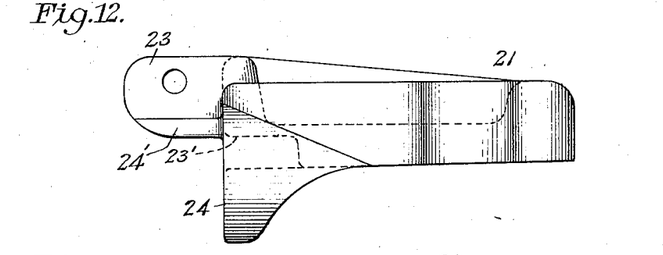
Fig. 12 is a side elevation of the deflector plate.
Figure 13:
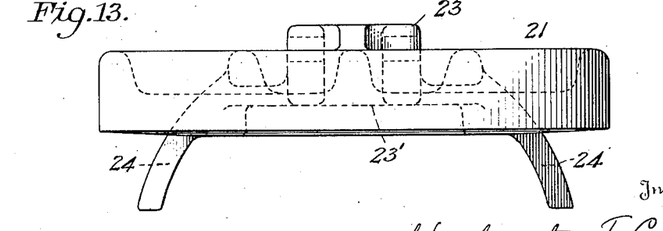
Fig. 13 is an end view of the deflector plate.
Figure 14:
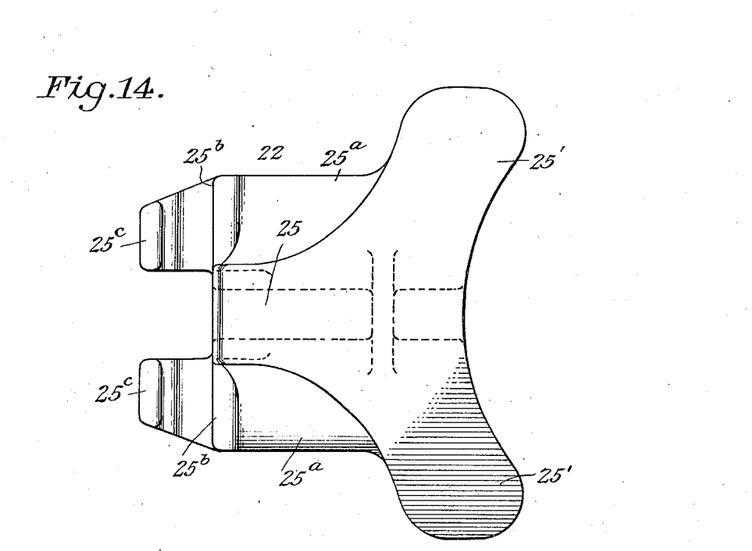
Figs. 14, 15 and 16 are views similar to Figs. 11, 12 and 13 of the bottom distributor plate.
Figure 15:
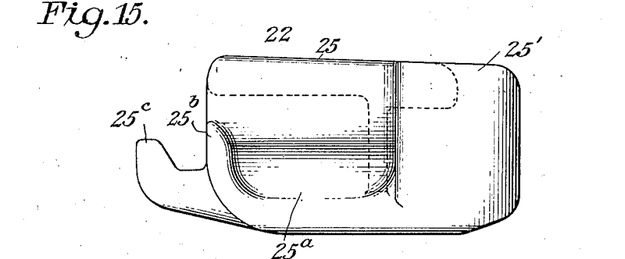
Figure 16:
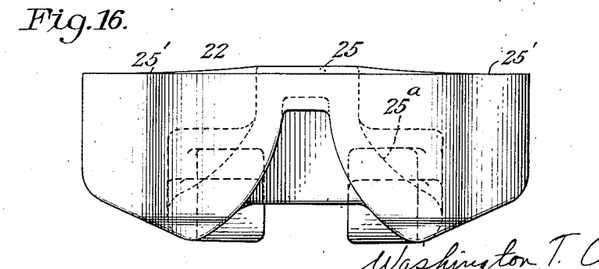

Referring now more particularly to the drawings, the numeral 5 designates the back sheets of a firebox of a locomotive, in which is mounted a firing tube 6, providing an aperture through which my improved stoker distributor projects. The discharge member 7 of the stoker is provided with a boss 8 having a bolt aperture 9 in which the body shank of the bolt 10 is positioned, said bolt being provided with a nut 11. This bolt, as shown clearly in Fig. 1, is provided with a T-head 12 for supporting the distributor tube in position on the discharge member 7, as hereinafter described.

The bore or passage of the distributor tube 13 is straight as shown in the drawings, but may be made flared from its rear end to its forward end, so that the tube has a cross-sectional area at its front end materially in excess of that at its rear end to facilitate the feed of the coal and prevent clogging of the tube when feeding wet coal or large lumps of coal accidentally wedged in the tube. The rear portion of the bottom of the tube is depressed, as at 13', for a purpose hereinafter explained. The tube 13 is provided on its upper surface at its rear end with two spaced vertically disposed lugs 14, between which is an inclined abutment surface 15. The forward ends of the lugs are each provided with a recess 16 into which the T-head 12 of the bolt 10 is adapted to seat. Spaced from and arranged in advance of the lugs 14 is a lug 17, which operates as a stop to limit the forward movement of the T-head of the bolt 10, but to permit sufficient forward movement of said T-head to adapt it to slide out of and free from engagement with the recesses 16 when it is desired to disconnect the distributor tube. The lugs 14, being spaced apart, and being closely engaged by the T-head of the bolt, automatically cooperate with the bolt to level the distributor tube 13 when the bolt is drawn tight against the discharge member 7 by the nut 11. The distributor tube will thus be accurately centered in working position, preventing unevenness of feed of the coal to the side sheet or to the central part of the firebox, such as would happen through the tilting or rotation of the distributor tube out of proper working position, which is possible in some of the constructions employed prior to my invention.

The lugs 14 provide a two-point suspension for the distributor tube 13 functioning with the T-head of the bolt 10 to clamp the tube 13 to the discharge end 7 against any possibility of tilting movement, as well as to hold the distributor tube 13 against casual rotation on its axis. Preferably only the upper part of the rear end of the tube 13 comes in contact with the discharge member 7, the lower portions of the discharge member and tube being shaped so as to be purposely spaced apart to permit of vertical adjustment of the discharge end of the tube by means of two adjusting and supporting screws 16'. The screws 16' are adapted to engage threaded openings in lugs 14' formed upon the bottom of the tube adjacent the sides thereof, at a suitable point in the length of the tube, the heads of said screws 16' being designed to rest against the bottom of the firing tube 6 to form third and fourth points of suspension, whereby the tube 13 is stably supported in position in the tube 6. By adjusting the screws 16' the weight of the front end of the distributor tube 13 is supported and the stress of weight divided between the bolt 10 and screws 16'. The tube 13 is provided near its forward end with a forwardly extending projection or horizontal lug 17' and a vertically extending lug 18, which are integral with the top of the tube, said lug 18 being perforated for passage of a cotter pin or equivalent fastening member 19, and the tube having abutment surfaces 18' at opposite sides of the lug 17'. The forward end of the tube 13 is provided at its bottom with a depressed portion 20 formed to provide a forwardly projecting central supporting lug 20ᵃ. On each side of the central supporting lug 20ᵃ, the forward end of the tube 13 is provided with a depending holding lug 20', each lug being provided with a shoulder 20ᵇ on its forward side and a curved abutment 20ᵉ on its rearward side.

The top deflector plate 21 and bottom distributor plate 22 are formed as independent castings which, in the event of their being rendered unserviceable by warping, accidental injury, or undue wear from abrasion or other cause, are replaceable independently of each other and of the distributor tube. The deflector plate 21 is of a suitable width and extends on the arc of a quadrant at its forward end, and thence tapers rearwardly uniformly to a reduced end which is provided with spaced vertical lugs 23, a rear supporting portion 23' carrying said lugs and lateral abutment shoulders 24 joined to the sides of the plates by strengthening and reinforcing webs 24'. The portion 23' rests upon the supporting projection 17' of the tube 13 and the shoulders 24 rest against the lateral abutment surfaces 18' to stably support the plate when the latter is fastened in position, the lugs 23 of the plate resting on the top of the tube on opposite sides of the lug 18 and receiving said lug between them, the lugs 23 having openings like the opening in the lug 18 for passage of the bolt or cotter pin 19, whereby the top plate is secured in place.

The bottom distributor plate 22 is formed with a body portion 25 provided with forwardly diverging distributing wings 25' having their upper surfaces located in a common plane with the body portion and the lateral extensions 25ᵃ at the sides of the body portion and in rear of the wings and which are shaped to provide forwardly diverging fuel feed channels. At the rear of these channels 25ᵃ and in alinement therewith the plate is provided with spaced vertical abutment shoulders or lugs 25ᵇ and upturned hooklike supporting lugs 25ᶜ. The body portion 25 provides a shelf-like member which is adapted to rest upon the supporting lugs 20ᵃ at the forward end of the tube 13 to dispose the plate 22 in working position, and the plate is held stably in such position by the bearing of its abutment shoulders 25ᵇ against the abutment shoulders 20ᵇ of the tube and by engagement of the holding hooks 25ᶜ with the curved abutments 20ᵉ of the holding lugs 20' on the tube, the weight of the forward portion of the plate serving to hold the plate against upward displacement while the abutment surfaces and lugs hold the plate against casual movement in any other direction. It will be observed that the upper surface of the lug 20ᵃ is inclined to provide an elevated tip 20ᶜ and a depression 20ᵈ in rear thereof, which adapt the upper faces of the body and wings of the distributor plate 22 to aline with the center of the upper surface of the bottom of the tube 13 for the free flow of the fuel from the tube to the distributor plate. The body part 25 of the plate rests on the tip 20ᶜ and overlies the depression 20ᵈ, which portions 20ᶜ and 20ᵈ provide surfaces allowing the plate to have vertical pivotal and rocking motions respectively, to adapt the plate to be tilted into and out of engagement with the lug 20ᵃ on the latter as a fulcrum or center of motion, in which action the holding hooks 25ᶜ move into and out of interlocking engagement with the holding lugs 20'. It will be seen from the foregoing, therefore, that the top deflector plate may be removed for repairs or renewal by the simple expedient of releasing a single fastening pin, while the bottom delivery plate may be disconnected for repairs or renewal by simply rocking it for a releasing action, the construction in each case, however, being such that casual displacement or movement of either plate out of proper working position can not occur, as it is effectually prevented by the engaging surfaces.

The tube 13 has three longitudinal zones on its lower inner face or bottom, the central zone 26 which is arranged to feed fuel centrally and to the forward part of the firebox, and two side portions or zones 26' which are in the form of depressions or channels communicating at their forward ends with the lateral channels 25ᵃ of the delivery plate 22, for the feed of the fuel to the side and rear portions of the firebox, the diverging wings of the delivery plate effecting a delivery of the fuel to the intermediate portions of the firebox, whereby an effective distribution of the fuel over the whole area of the firebox is obtained. The center zone of the bottom 26 is preferably plane-surfaced and extends at an upward and forward inclination or pitch with respect to the center line x—x of the tube, or may be parallel if desirable, to feed the central portion of the body of fuel at a desirable high elevation to the body of the distributor plate for reliable distribution to the front of the firebox, while the zones or channels 26' are pitched or inclined downwardly and forwardly on a proper slope for cooperation with the channels 25ᵃ of the feed plate to secure a desirable gravity as well as a force feed distribution of the particles of fuel traveling through the channels to the sides of the firebox. By the construction described the feed zones or surfaces of the tube and distributor plate are arranged to deliver portions of the fuel at proper elevations for a spreading delivery, and provide unobstructed surfaces which permit of a free and easy passage of the fuel. By having the channels gradually sloping and deepened as they approach the distributor plate, the mass of fuel tending to feed forwardly in a straight line in the delivery tube is properly divided by gravity, coal falling from the central zone into the side zones in the forward feed, so that an automatic spreading or distribution of the fuel at different levels is obtained, to enable the fuel to be fed with less resistance and tendency to choke the tube, as well as to supply the fuel in proper proportions to be conveyed in different layers or at different levels and in a most effective manner to all portions of the firebox.

It will be observed that the upward slope or pitch of the surface 26 and downward slope or pitch of the surfaces 26' results in the bottom of the tube being of greatly increased thickness or depth at its forward end, whereby thickened surfaces are provided to better withstand abrasion, strains and wear, and to better provide for the formation of engaging surfaces on the tube and distributor plate to adapt the distributor plate to be stably supported in place in the manner described.

In practice, the rear portion of the upper surface of the bottom of the tube 13 is preferably provided with a cavity or recess 27 eliminating the central zone portion 26 and channel portions 26' between the rear end of the tube and a point in advance thereof, which may be from one quarter to a third or more of the length of the tube. This recess or cavity is provided to receive a renewable wear plate 28, adapted to fit snugly therein, which is provided with a central zone 29 and channel portions 30 conforming to and complementarily completing the central zone and channels at the rear of the tube. This wear plate is wedge-shaped or otherwise shaped to make its upper surface conform to the pitch of the central zone 26, and said plate is secured in position in any suitable manner. In the present instance the plate as shown is provided with a screw stud 31 passing downwardly through an opening in the thickened and depressed part 13' of the tube and receiving a nut 32 for fastening it in position. This plate sustains the abrasive wear of the coal at a point where the tube is most subject to such wear, and may be removed and a new plate substituted therefor when worn to a certain degree, so that the surface formation of the bottom wall of the tube may be properly preserved. By the use of this plate, which is renewable at small cost, the necessity of discarding the entire tube, when unduly worn at the particular point mentioned, is wholly overcome.

It is evident that my invention provides a construction in which the parts 21 and 22 most subject to wear may be easily and conveniently replaced, when worn or injured, without the necessity of dismantling the apparatus or removing the tube 13, so that the distributor may at all times be kept in working order and repairs made in a short time and at a very low cost. It may be found necessary to remove the tube to renew plate 28 when worn out, but this plate makes it possible for the tube to last indefinitely.

Figure 17:
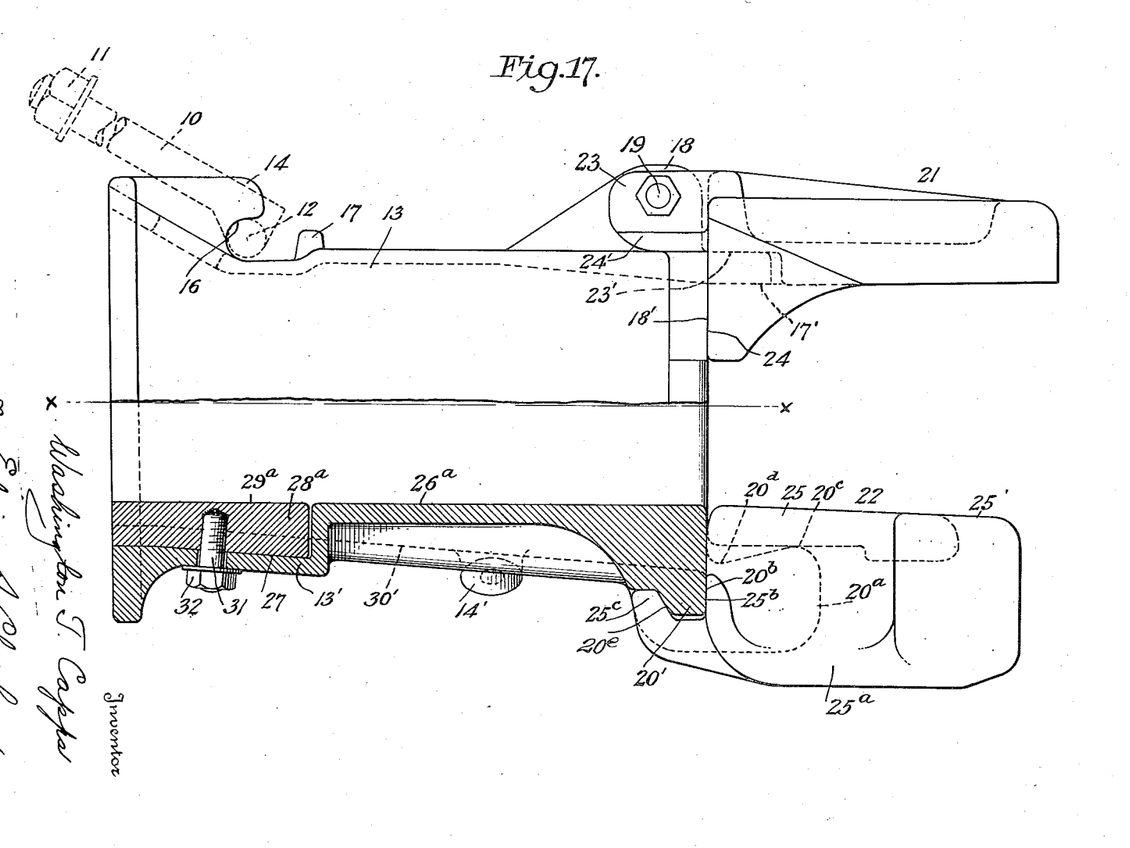
Fig. 17 is a view similar to Fig. 7 showing a slight modification.

In some cases the upper surface of the central zone 26ᵃ of the tube bottom may be disposed parallel with the center line x—x of the tube and the face 29ᵃ of plate 28ᵃ and surfaces of the channels 30' disposed in proper relationship thereto, as shown in Fig. 17.

What I claim is:

1. In a locomotive stoker, a distributor tube having a forward discharge end, a distributor plate at the bottom of the discharge end of the tube, and a deflector plate at the top of the discharge end of the tube, the tube and deflector plate having supporting and attaching portions comprising an extension from the forward end of the tube and abutment surfaces at opposite sides thereof, coacting supporting and abutment portions on the deflector plate, fastening lugs on the tube and plate, and fastening means connecting said lugs.

2. In a locomotive stoker, a distributor tube having a forward discharge end, a distributor plate at the bottom of the discharge end of the tube, and a quadrantal deflector plate at the top of the discharge end of the tube, the tube and deflector plate having supporting and attaching portions comprising an extension from the forward end of the tube and abutment surfaces at opposite sides thereof, coacting supporting and abutment portions at the inner end of the deflector plate, fastening lugs on the tube and plate, and fastening means connecting said lugs.

3. In a locomotive stoker, a distributor tube having a forward discharge end, a detachable deflector plate at the top of the discharge end of the tube, the tube and deflector plate having supporting and attaching portions comprising an extension from the forward end of the tube and abutment surfaces at opposite sides thereof and coacting supporting and abutment portions on the plate, and a detachable distributor plate at the forward end of the tube, said forward end of the tube having at its bottom a forwardly projecting shelf and said shelf, the tube and distributor plate having supporting surfaces and interlocking surfaces engageable and disengageable by rocking movements of the distributor plate.

4. In a locomotive stoker, a distributor tube having a bottom feed surface terminating at its discharge end in a supporting projection, a lug at each side of said supporting projection, each lug having a shoulder on its forward side and an abutment on its rearward side, and a detachable distributor plate having a supporting portion resting on said projection in rocking engagement therewith, an abutment at each side of said supporting portion to engage the shoulder on the respective lug of said tube, and hooked members engaging the abutments of said lugs.

5. In a locomotive stoker, a distributor tube having a bottom feed surface terminating at its discharge end in a supporting projection, a lug at each side of said supporting projection, each lug having a shoulder on its forward side and an abutment on its rearward side, and a detachable distributor plate having a supporting portion resting on said projection in rocking engagement therewith, an abutment at each side of said supporting portion to engage the shoulder on the respective lug of said tube, and hooked members engaging the abutments of said lugs, said projection having its upper face formed to provide a supporting tip on which the supporting portion of the plate is adapted to rest and a clearance recess in rear of said tip.

6. In a locomotive stoker, a distributor tube having a bottom feed surface formed with a plane central feed table portion and downwardly and forwardly inclined feed channels at opposite sides thereof, said tube having at its forward discharge end a supporting projection, a lug at each side of said supporting projection, each lug having a shoulder on its forward side and an abutment on its rearward side, and a detachable distributor plate having a supporting portion resting on said projection in rocking engagement therewith, said distributor plate forming a continuation of the central feed table of the tube, said distributor plate being provided with channeled portions at the sides of the supporting portion registering with the feed channels of the tube and being also provided with an abutment at each side of said supporting portion to engage the shoulder on the respective lug of said tube, and hooked members engaging the abutments of said lugs.

7. In a locomotive stoker, a distributor tube having an upwardly and forwardly inclined closed bottom portion provided at its receiving end with a recess, said recess being of gradually increasing depth in a forward direction and having a bottom wall, a removable wear plate of wedge form in longitudinal section seated in said recess with its upper surface lying flush with the upper face of said bottom portion of the distributor tube, and fastening means extending upward through said bottom wall of the recess and detachably securing said plate against casual displacement from said recess.

8. In a locomotive stoker, a distributor tube having a forward discharge end, a detachable deflector plate at the top of the discharge end of the tube, and a detachable distributor plate at the bottom of the discharge end of the tube, said tube having a shelf extending forwardly therefrom below the plane of its bottom at its discharge end, a lug at each side of said shelf, each lug having a shoulder on its forward side and an abutment on its rearward side, said distributor plate having a supporting portion resting upon said shelf in rocking engagement therewith, an abutment at each side of said supporting portion to rest against the shoulder on the respective lug of said tube, and means on said distributor located below and in rear of said supporting portion for engaging the abutments on the lugs of said tube to hold the distributor plate in applied position on the tube, said means on the distributor plate being engageable with and disengageable from the abutments on the lugs of said tube, in applying the distributor plate to and removing it from the tube, by rocking movements of said supporting portion of the distributor plate on the shelf of the tube.

9. In a locomotive stoker, a distributor member having a bottom feed surface and forward discharge end, and a detachable delivery plate at the forward end of said distributor member, said member and plate having interlocking portions, comprising a supporting projection extending forwardly from said distributor member and holding means on the underside of said distributor member at the rear of said projection, a supporting portion on the plate to rest on said supporting projection, and holding means extending from the plate below and in rear of said supporting portion for coaction with the holding means on said distributor member to hold the plate in applied position on said distributor member, said supporting portion and holding means on the plate being engageable with and disengageable from the supporting projection and holding means on said distributor member, in applying the plate to and removing it from said distributor member, by rocking movements of the supporting portion of the plate on said supporting projection of said distributor member.

10. In a stoker, a distributor member having a fuel feed surface terminating at its discharge end in a supporting projection, a lug at each side of said supporting projection, each lug having a shoulder on its forward side and an abutment on its rearward side, and a detachable distributor plate having a supporting portion resting on said projection in rocking engagement therewith, an abutment at each side of said supporting portion to engage the shoulder on the respective lug of said distributor member, and hooked members engaging the abutments of said lugs.

11. In a stoker, a distributor member having a fuel feed surface terminating at its discharge end in a supporting projection, a lug at each side of said supporting projection, each lug having a shoulder on its forward side and an abutment on its rearward side, and a detachable distributor plate having a supporting portion resting on said projection in rocking engagement therewith, an abutment at each side of said supporting portion to engage the shoulder on the respective lug of said distributor member, and hooked members engaging the abutments of said lugs, said projection having its upper face formed to provide a supporting tip on which the supporting portion of the plate is adapted to rest and a clearance recess in rear of said tip.

12. In a stoker, a distributor member having a fuel feed surface formed with a central feed table portion and downwardly and forwardly inclined feed channels at opposite sides thereof, said distributor member having at its forward discharge end a supporting projection, a lug at each side of said supporting projection, each lug having a shoulder on its forward side and an abutment on its rearward side, and a detachable distributor plate having a supporting portion resting on said projection in rocking engagement therewith, said distributor plate forming a continuation of the central feed table zone of the distributor member, said distributor plate being provided with channeled portion at the sides of the supporting portion registering with the feed channels of the distributor member and being also provided with an abutment at each side of said supporting portion to engage the shoulder on the respective lug of said distributor member, and hooked members engaging the abutments of said lugs.

13. In a locomotive stoker, a distributor tube having a bottom feed surface terminating at its discharge end in a supporting projection, a lug at each side of said supporting projection, each lug having a shoulder on its forward side and an abutment on its rearward side, and a detachable distributor plate having a supporting portion resting on said projection in rocking engagement therewith, said distributor plate being provided with an abutment at each side of its supporting portion to engage the shoulder on the respective lug of said tube, and hooked means projecting rearwardly therefrom for engaging the abutments on said lugs to hold the distributor plate in applied position on said tube, the construction and arrangement of the lugs on said tube and the hooked means on the plate being such that the distributor plate may be engaged with and disengaged from the tube by downward and upward swinging movements, respectively.

WASHINGTON T. CAPPS.